UNITED STATES PATENT OFFICE.

HENRY PEMBERTON, JR., OF PHILADELPHIA, PENNSYLVANIA.

DEHYDRATING SODIUM SULPHATE.

SPECIFICATION forming part of Letters Patent No. 392,286, dated November 6, 1888.

Application filed July 18, 1888. Serial No. 280,341. (No specimens.)

*To all whom it may concern:*

Be it known that I, HENRY PEMBERTON, Jr., of Philadelphia, in the State of Pennsylvania, have invented a certain new and useful Process of Dehydrating Crystallized Sulphate of Soda, commonly called "Glauber's salts;" and I do hereby declare the following to be a full, clear, and exact description of the same.

Crystallized Glauber's salt ($Na_2SO_4+10H_2O$) has when pure the following composition:

| | Per cent. |
|---|---|
| Anhydrous sulphate of soda | 44.10 |
| Water | 55.90 |
| Total | 100.00 |

But when the native crystals are brought from the soda lakes, where they are found in large quantities in several of the States and Territories of the United States, the percentage of water is increased by mechanical absorption, and frequently amounts to sixty per cent., so that only forty per cent. of the crystal is anhydrous sulphate of soda; or, in other words, there are one hundred and fifty tons of water to every one hundred tons of dry sulphate of soda.

It is known that when Glauber's salt is heated to or above a temperature of 34° centigrade the water of crystallization is set free, and, in common parlance, the crystals are said to "melt" or "turn into water." When this happens, the sulphate of soda partly remains dissolved in the water and partly separates out as an anhydrous salt.

The ordinary way hitherto of obtaining the anhydrous sulphate of soda from Glauber's salt has been to heat the crystals in suitable vessels until they dissolve in the water of crystallization, and then boil down or evaporate the water entirely until the mass has assumed a mush-like appearance, after which it is removed to a reverberatory furnace and calcined to dryness. This process entails a very heavy expense both in fuel and labor, particularly in the labor necessary in stirring and manipulating the mass while the water is being evaporated to prevent it from caking on the pan as it thickens.

I have determined by experiment that when crystallized sulphate of soda is melted in its water of crystallization that only about one-half of the sulphate of soda remains in solution, while the remaining half is deposited in the form of a fine white powder bearing no resemblance to the original crystal.

By my process for obtaining anhydrous sulphate of soda from crystallized sulphate of soda I heat the crystallized sulphate of soda in any convenient vessel with a hot saturated solution of sulphate of soda until the crystal melts. I find the amount of heat to set free the water of crystallization is moderate—about 100° Fahrenheit—although a higher or lower temperature may be used, if desired. The heating may be done in any kind of water-tight vessel or pan. Indeed, the same vessel in which the crystals are contained may be used, although it is preferable to have a separate vessel.

If it should be found that all of the crystals have not been decomposed, the solution, after having been run off from the crystals, is pumped up into the vessel in which it was first heated, brought then to the proper temperature, and again run into the vessel containing the crystals. Experience has shown that two treatments will generally be required. After the water of crystallization has been set free and the crystals as such have disappeared, the contents of the vessel are allowed to remain quiet until the anhydrous salt not contained in solution has settled. The saturated solution, increased in volume by the water of crystallization, which contains a portion of the sulphate of soda in solution, is then run off, and the excess of the solution over that originally used may be allowed to cool or to evaporate and cool, when it soon forms new crystals. The rest of the saturated solution is again heated and used in the same way on a new charge of crystals. The anhydrous sulphate of soda, which has settled out in the heating-vessel, is removed from the vessel, allowed to drain, and then heated for a short time in a reverberatory furnace, or otherwise, so as to thoroughly dry it. It is then withdrawn from the furnace and appears as a brilliant white anhydrous sulphate of soda.

The crystals formed from the evaporation or cooling of the excess of liquid run off from the heating-vessel may be used as raw materal upon a repetition of the same process.

This process possesses the advantage of eliminating the stirring or manipulation of the crystals, as the latter remain quietly in the vessel or tank, while the heat is applied from the saturated solution of sulphate of soda, which flows gradually through the crystals till they are melted. The heat by this process can be applied with great ease, and there is no tendency to cake.

In an application bearing even date herewith I have claimed the process of obtaining anhydrous sulphate of soda from natural or artificial Glauber's salt by treating the crystals at a moderate heat until they dissolve in their water of crystallization, then allowing the anhydrous salt not in the solution to separate, running off the supernatant saturated solution, to be used again, and drying the salt which has separated.

In the present application I claim—

The process of obtaining anhydrous sulphate of soda from natural or artificial Glauber's salt by treating the crystals with a hot saturated solution of sulphate of soda until they melt, then allowing the anhydrous salt not in the solution to settle or separate, running off the sulphate of soda obtained from the crystals in solution or allowing it to recrystallize, so as to be used again, and drying the salt which has separated, substantially as described.

HENRY PEMBERTON, JR.

Witnesses:
LEWIS R. DICK,
J. H. BELL.